United States Patent [19]

Metz

[11] 4,007,576
[45] Feb. 15, 1977

[54] METHOD AND APPARATUS FOR CONTROLLING STATIC CHARGES

[75] Inventor: Bruce E. Metz, Wilmington, Del.
[73] Assignee: Hercules Incorporated, Wilmington, Del.
[22] Filed: June 19, 1975
[21] Appl. No.: 588,557
[52] U.S. Cl. .............................. 53/28; 53/182 R; 361/220 R X
[51] Int. Cl.² ....................................... B65B 61/00
[58] Field of Search ............ 53/28, 180 M, 182 M, 53/167; 317/2 R, 2 F, 4; 93/82

[56] References Cited

UNITED STATES PATENTS

| 3,350,840 | 11/1967 | Grafingholt et al. | 53/180 M |
|---|---|---|---|
| 3,396,308 | 8/1968 | Whitmore | 317/2 F |
| 3,475,652 | 10/1969 | Levy | 317/2 F |
| 3,643,128 | 2/1972 | Testone | 317/2 F X |
| 3,793,558 | 2/1974 | Lindsay et al. | 317/2 F |
| 3,831,060 | 8/1974 | Spengler | 317/2 F |
| 3,904,929 | 9/1975 | Kanaya et al. | 317/2 F X |

FOREIGN PATENTS OR APPLICATIONS

| 1,255,021 | 11/1967 | Germany | 317/2 R |
|---|---|---|---|
| 2,017,401 | 10/1971 | Germany | 53/182 M |

Primary Examiner—Travis S. McGehee
Assistant Examiner—J. Sipos
Attorney, Agent, or Firm—Stanley A. Becker

[57] ABSTRACT

A method and apparatus for controlling static charges on film formed into packages and filled with particulate material to prevent the particulate material from attaching to the film and degrading the seal area of the package.

10 Claims, 2 Drawing Figures ative mesearch 4,007,576

METHOD AND APPARATUS FOR CONTROLLING STATIC CHARGES

BACKGROUND OF THE INVENTION

This invention relates to a method and apparatus for controlling static charges, and particularly to a method and apparatus for controlling static induced product seal inclusions in packaging operations involving materials inclined to generate or accumulate static electrical charges.

In machines for packaging dry particulate material such as coffee in plastic film packages, attachment of some of the material to the inside of the plastic film is a problem. This attachment is most often caused by static charges on the film and also static charges on the particulate material as it is injected into the package. The presence of such material clinging to the inside of the film is unsightly, but more importantly prevents a good seal from being effected. Heretofore, conventional static eliminators have been positioned about the outside of the plastic packages to remove the static charge from the film. This has not proven to be satisfactory for two reasons; (1) the static charge must migrate through the film before it can be removed, and (2) there is no practical opportunity to control static on the product itself. Removing the static charge in the conventional manner becomes increasingly difficult with high barrier films or thicker films and with high packaging speeds. Additionally, particulate materials that are being loaded into the plastic packages frequently have a static charge on the individual particles themselves. Static eliminators positioned adjacent to the outside of the film are incapable of removing such static charges.

The present invention is directed to a method and apparatus for overcoming the foregoing problems.

SUMMARY OF THE INVENTION

The subject invention includes apparatus which is adapted to be mounted to the fill tube of packaging machines to control both the static charge on the film passing over the fill tube and on the product being packaged as it discharges from the fill tube. The apparatus includes a conductive emitter ring having a plurality of pins or needles projecting outwardly therefrom at spaced points about the periphery of the ring. The emitter ring is connected to a high voltage source, preferably AC. Air or gas is directed under pressure to flow around the emitter ring. When a high voltage is applied to the emitter ring a corona discharge is produced at the points which causes air to ionize in the vicinity of such points producing an ionized field. The ionized field eliminates and neutralizes the static charge on the adjacent moving film and additionally controls static charges that may be present on the particulate material being packaged. The ionized gas accomplishes this task by providing an appropriate connection to each ground. Additionally, the air or gas boost provided extends the effective range of the ionized field and also serves to keep the emitter ring free of any of the material being packaged since an accumulation of particles on the emitter points could result in decreased effectiveness of the apparatus. A proximity ground, which may be the metal fill tube, is provided to dissipate the charge and provide maximum performance and efficiency of the apparatus. The control of static charges prevents small product particles from clinging to the film and subsequently interfering with the seal quality exhibited by the finished packaged.

Other advantages of the present invention will be apparent from the following detailed description of the invention when considered in conjunction with the following detailed drawings, which drawings form a part of the specification. It is to be noted that the drawings illustrate only typical embodiments of the invention and are therefore not to be considered limiting of its scope for the invention may admit to other equally effective embodiments.

DESCRIPTION OF THE INVENTION

Figure 1:
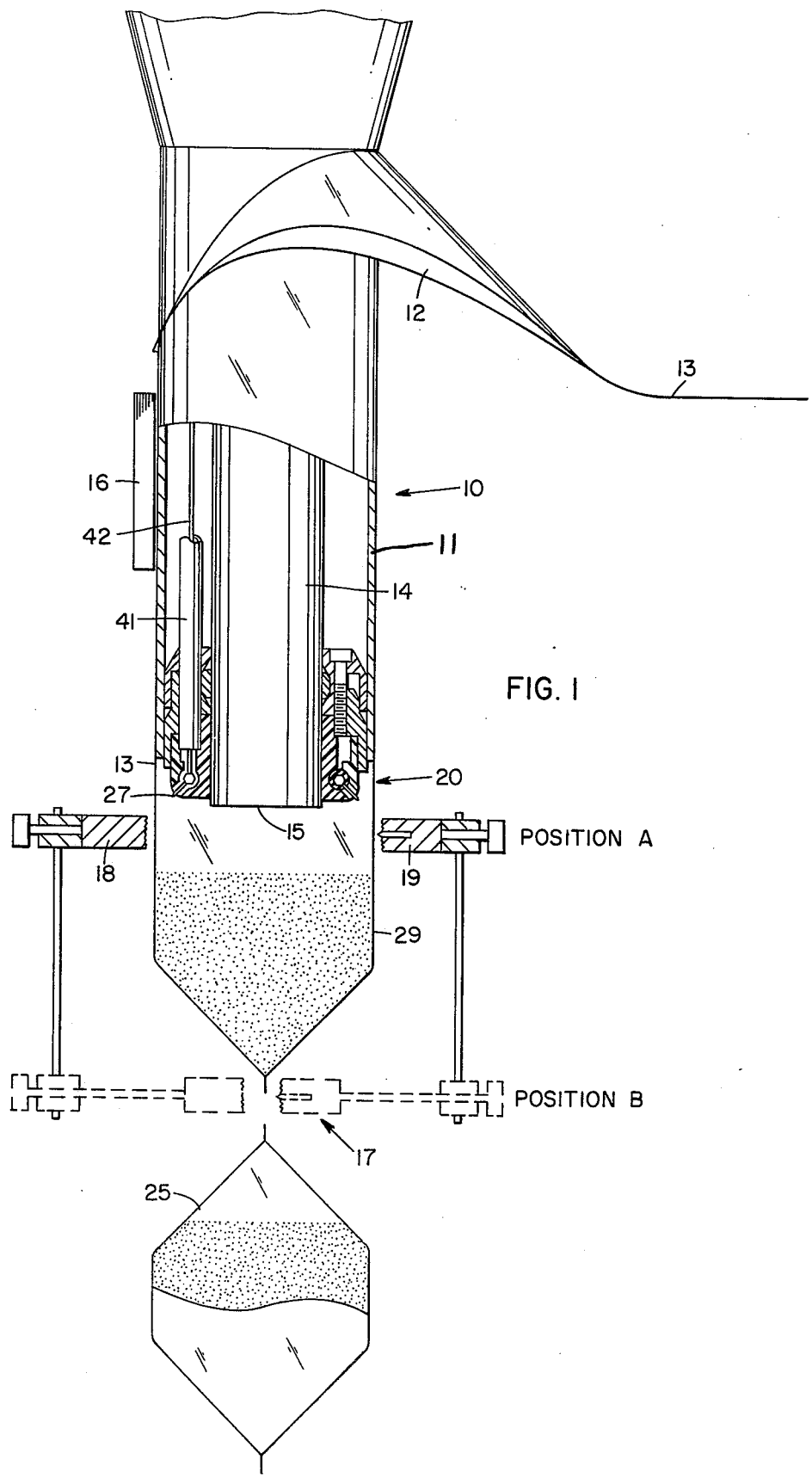
FIG. 1 is a view illustrating a portion of a vertical form and fill packaging machine having static elimination apparatus in accordance with the principles of this invention.

Referring to FIG. 1, there is shown a conventional packaging machine generally designated as 10 having a fill tube 14 through which particulate material passes for loading into plastic film packages such as 25. A typical packaging machine is more fully described in U.S. Pat. No. 2,899,875, which is incorporated by reference herein. Plastic film 13 is advanced from a supply roll (not shown) and is formed about a forming collar 12 and a guide tube 11 into a tubular shape. Seaming facilities generally designated as 16 form the side seam of the package usually by heat sealing of adhesive bonding, as the film 13 advances downwardly about the tube 11. The fill tube 14 is mounted coaxially with the guide tube 11 and particulate material is discharged past a bottom edge 15 thereof. The subject static eliminator 20 is mounted to the the fill tube 14 so that the ionizing portion of static eliminator 20 is positioned in close proximity to the inner surface of the advancing film 13 and at the bottom edge 15 of the fill tube 14. Positioned below the bottom edge 15 of the fill tube 14 are sealing facilities generally designated as 17 including jaws 18 and 19, which heat seal the film to form packages such as package 25.

The operation of the sealing jaws varies in different conventional packaging machines. In some machines, as illustrated in FIG. 1, the jaws move up and down and serve to advance the film as well as move together to seal the packages. In other machines, the jaws may only move together to seal the packages while other facilities are provided to advance the package. Usually, cutting facilities are incorporated within or adjacent to the jaws to separate the filled and sealed packages. In FIG. 1, the jaws 18 and 19 are shown in their raised position referred to as Position A. The bottom of package 29 has been previously sealed by the jaws. Particulate material is then fed down the fill tube 14 and is properly metered either by volume or by weight so that a precise amount enters the package 29 formed by the heat seal previously made. As the particulate material passes through the fill tube 14 and enters the package 29, the static charge on the film created by the advancement of the film as well as any residual charge that may have been on the film, is eliminated by static eliminator 20 so that no particles cling to the inner surface of the film. When the package is filled, jaws 18 and 19 are actuated to move together and seal the top of the filled package. The jaws remain closed and move downwardly to Position B, advancing the film so that the next package can be filled. Cutting facilities (not shown) then separate the filled package from the film.

The static eliminator 20 is described more fully hereinafter with reference to FIG. 2. However, for purposes of explanation of its operation in the packaging machine 10, when the static eliminator 20 is energized, an ionized field is produced at the bottom edge 15 of fill tube 14. Additionally, gas passing around the static eliminator is at least partially ionized before reaching the bottom edge of fill tube 14 by being in proximity to a high voltage wire connected to the static eliminator as described more fully hereinafter. As the moving film 13 passes through the ionized field the static charges on the film are eliminated. Additionally, the particulate material falling through the fill tube 14 also passes through the ionized field and thus static charges thereon are removed. Consequently, as the film 13 advances, there is no static charge on the film and the particulate material all falls to the bottom of the package leaving the sealing areas contacted by the jaws 18 and 19 free of any particles so that effective seals can easily be accomplished.

Figure 2:
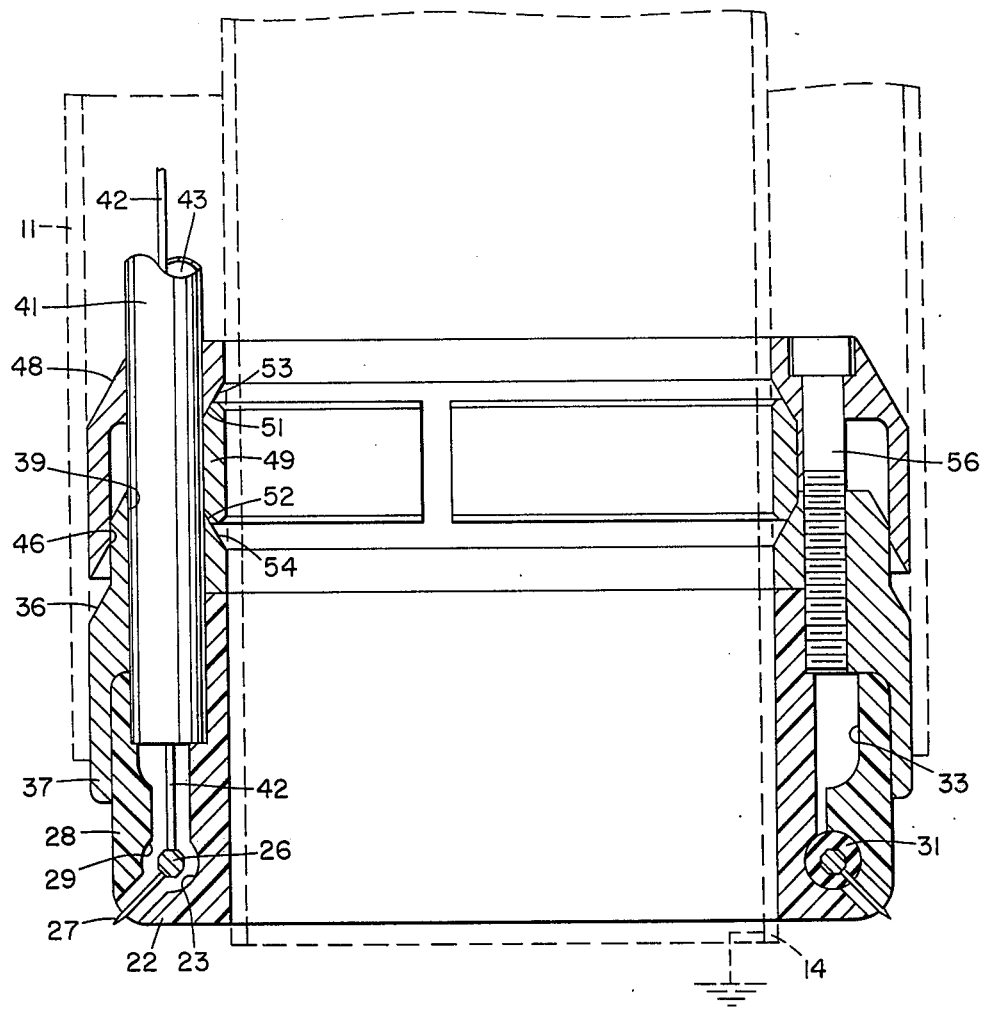
FIG. 2 is an enlarged cross-sectional view of the static elimination apparatus of FIG. 1.

With reference now also to FIG. 2, there is shown static elimination apparatus in accordance with the present invention. The static eliminator 20 includes an inner ring 22 made of an insulating material which has a grooved portion 23 for receiving an emitter ring 26 having a plurality of pins or needles 27 projecting therefrom to provide ionizing points. An outer insulating ring 28 fits over the inner insulating ring 22 and has an annular groove 29 formed on its inner surface to correspond with groove 23 in the inner insulating ring 22 to provide an annular passageway the emitter ring 26. The emitter ring 26 is made from an electrically conductive material which is in electrical contact with electrical conductive pins 27. A plurality of insulating washers or sleeves 31 surround the ring 26 at spaced intervals to properly space it within the annular passageway formed by rings 22 and 28. The inner insulating ring 22 and outer insulating ring 28 are formed to provide an annular passageway 33 therebetween when fitted together. An outer ground ring 36 of an electrically conductive material has a downwardly projecting portion 37 which surrounds a part of the outer insulating ring 28 and serves to fully enclose the annular air or gas passageway 33. The outer ground ring 36 has a passageway 39 formed therethrough for receiving a gas conduit 41 having a high voltage electrical conductor 42 therein surrounded by an annular hollow space 43 to allow the passage of gas or air therethrough. The electrical conductor 42 is connected by soldering, welding, or the like, to the emitter ring 26. The conduit 41 has its discharge end in communication with the annular passageway 33 to allow the passage of gas or air through the annular chamber 33 and past the projecting pins 27 of the emitter ring 26. The outer ground ring 36 has an upper portion 46 of reduced diameter. A top clamping ring 48 fits over the reduced diameter portion 46 of the outer ground ring 36. Interposed between the top clamping ring 48 and the outer ground ring 36 is a split compressing ring 49 having chamfered surfaces 51 and 52 which cooperate with chamfered surfaces 53 and 54 respectively of the top clamping ring and outer ground ring 36.

In attaching the static eliminator 20 to the fill tube 14, the device is moved over the discharge end of the fill tube 14 such that the ionizing points 27 are positioned in close proximity to the inner surface of the moving film and at the bottom edge of the fill tube. Threaded fasteners such as bolts 56 (only one of which is shown) are tightened to urge the outer ground ring 36 and top clamping ring 48 together. As the outer ground ring 36 and top clamping ring 48 move together, the cooperation of the chamfered surfaces 53 and 54 with chamfered surfaces 51 and 52 close the split compression ring 49 firmly about the fill tube 14, providing a firm coupling thereto. It is necessary to provide a good proximity ground when using the static eliminator 20 and this is accomplished, for example, by grounding the fill tube which in turn is connected to the compression ring 49.

In operation, a high voltage is applied from a high voltage source (not shown) to conductor 42 which is connected to the emitter ring 26. A corona discharge occurs both around the conductor 42 within spaced 43 and at the points of the pins 27, causing the air or gas in the vicinity thereto to ionize and produce an ionized field. Typically high AC voltages of about 1500-8000 volts may be used to obtain high efficiency static elimination. The ionized field removes the static charges from the film 13 as it passes by the ionizing portion of the static elimination device 20. The forced passage of air or gas through the conduit 41 and annular passageway 33 and past the emitter ring 26 increases the effective area of the ionized field. Additionally, the efficiency of the static eliminator is increased due to the air or gas being at least partially ionized by high voltage conductor 42 before it reaches the pins 27. Also, the passage of air or gas through conduit 41 serves to keep the static eliminator 20 clean. Additionally, with particulates that require gas flush packaging, it is believed that the manner in which gas is passed into the package being filled and the physical shape of the static eliminator 20 effectively forms a gas dam, thereby preventing gas from escaping before a seal is made. This feature allows a significant saving in the amount of gas needed for proper packaging.

As the particulate material passes through the fill tube 14, it also passes through the ionized field at the bottom edge of the fill tube. Hence, static charges that may be present on the particulate material will also be controlled. Consequently, the sealing of the packages is accomplished with all of the particulate material falling into the bottom of the package, leaving the sealing area free for an effective seal to be made.

While the subject static elimination device has been described as being mounted to the outside of a fill tube, it is to be understood that it could also be mounted to the inside of a fill tube if desired. For example, an expandable collet could be incorporated in the device for expanding and gripping the inside of a fill tube, or set screws or other conventional fastening facilities could be used to securely mount the device to the fill tube.

Furthermore, while it has been indicated above that the subject method and apparatus is particularly applicable for packaging coffee in flexible film packages, it is to be understood that the invention is also applicable to any situation where it is necessary to control static in packaging any material in any type of package, including non-flexible as well as flexible packages.

It is to be understood that the above described embodiments are merely illustrative of applications of the principles of this invention, and that numerous other arrangements and modifications may be made within the spirit and scope of the invention.

I claim:

1. A method for controlling static charges on moving film being formed into packages and being filled with particulate material through a fill tube with said material discharging past the bottom edge of said fill tube comprising:

positioning the ionizing portion of a static elimination device in close proximity to the inner surface of said moving film and at the bottom edge of said fill tube; and applying a high voltage to said static elimination device to produce an ionized field about the bottom edge of the fill tube to remove the static charges on both said moving film and on the particulate material passing through said field.

2. A method as set forth in claim 1 including the step of directing gas under pressure past said static elimination device to increase the effective range of said ionized field.

3. A method as set forth in claim 2 including the step of at least partially ionizing the gas before it is directed past said static elimination device.

4. In a packaging method wherein a moving film is formed into a package, filled with a particulate material through a fill tube with said material discharging past the bottom edge of said fill tube, and said package is closed by sealing, the improvement of which comprises producing an ionized field (a) in close proximity to the inner surface of the film at the sealing position to control the static charge on the moving film, and (b) at the bottom edge of the fill tube to control the static charge on the particulate material.

5. In a packaging method as set forth in claim 4 the additional step of directing gas under pressure toward said ionized field.

6. Apparatus for eliminating static from a moving film being formed about a fill tube into tubular packages which are filled with particulate material through said fill tube, with said material discharging past the bottom edge of said fill tube, comprising:

a conductive ring having a plurality of spaced ionizing points projecting therefrom;

means for mounting said ring to said fill tube to position said points in close proximity to the inner surface of said moving film and at the bottom edge of said fill tube;

means for applying a high voltage to said ring to produce an ionized field about the bottom edge of said fill tube; and means for insulating said ring from said fill tube.

7. Apparatus as set forth in claim 6 including means for directing gas under pressure past said ionizing points to increase the effective range of said ionized field.

8. Apparatus as set forth in claim 7 including means for at least partially ionizing said gas before it passes said ionizing points.

9. Apparatus for removing static from a moving film being formed about a fill tube into a package which is filled with particulate material through said fill tube, with said material discharging past the bottom edge of said fill tube, comprising:

an electrically conductive emitter ring having a plurality of spaced ionizing points projecting therefrom;

an insulating member having an annular groove formed therein for receiving said emitter ring, said member having an opening formed therein in communication with said annular groove to allow said ionizing points to project thereinto;

means for connecting said emitter ring to an AC high voltage supply;

means for directing gas under pressure into and through said opening in said insulating member;

a split compression ring having upper and lower wedge shaped surfaces;

a pair of conductive members positioned about said compression ring and being movably mounted toward each other and connected to said insulating member, said members having inner opposed wedge shaped surfaces adapted to cooperate with said wedge shaped surfaces of said conductive members; and means for moving said conductive members together for closing said compression ring to grip said fill tube to position said points in close proximity to the inner surface of said moving film and at the bottom edge of said fill tube.

10. Apparatus as set forth in claim 9 wherein said gas directing means includes a hollow tubular member, and said high voltage connecting means includes an electrical conductor which is mounted within said hollow tubular member, and wherein gas passing through said hollow tubular member is at least partially ionized as it passes in proximity to said high voltage electrical conductor.

* * * * *